United States Patent [19]

Marzolf

[11] 4,312,001
[45] Jan. 19, 1982

[54] DEVICE FOR THE TRANSMISSION OF MEASURED VALUES

[75] Inventor: René Marzolf, Eschborn, Fed. Rep. of Germany

[73] Assignee: VDO Adolf Schinling AG, Fed. Rep. of Germany

[21] Appl. No.: 100,034

[22] Filed: Dec. 4, 1979

[30] Foreign Application Priority Data

Dec. 15, 1978 [DE] Fed. Rep. of Germany ....... 2854199

[51] Int. Cl.³ .................... G08B 21/00; B60C 23/00
[52] U.S. Cl. ............................ 340/870.16; 340/58; 340/870.32; 73/146.5
[58] Field of Search ............... 340/58, 177 R, 189 M, 340/195, 196, 201 R, 572, 152 T, 870.16, 870.28, 870.31, 870.32; 343/6.5 SS, 6.8 R; 455/78, 83, 99, 85, 345; 200/61.22, 61.25; 324/178, 179, 167; 307/9, 10 R, 118; 73/146.4, 146.5

[56] References Cited

U.S. PATENT DOCUMENTS

| | | | |
|---|---|---|---|
| 3,500,459 | 3/1970 | Battin et al. | 455/78 |
| 3,723,966 | 3/1973 | Mueller et al. | 340/58 |
| 3,745,569 | 7/1973 | Works et al. | 343/6.5 SS |
| 3,798,642 | 3/1974 | Augenblick et al. | 340/572 |
| 3,836,842 | 9/1974 | Zimmermann et al. | 340/572 |
| 4,023,167 | 5/1977 | Wahlstrom | 343/6.5 SS |
| 4,117,481 | 9/1978 | Constant | 343/6.5 SS |
| 4,148,008 | 4/1979 | Lusk et al. | 340/58 |

Primary Examiner—James J. Groody
Attorney, Agent, or Firm—Eric P. Schellin

[57] ABSTRACT

An apparatus for transmitting measured value signals from a movable object to an object fixed relative thereto, includes a transmitter and receiver, each containing a common oscillatory circuit, carried on the fixed object, and a coupling circuit, also containing an oscillatory circuit, carried by the movable object, the oscillatory circuits for the transmitter and receiver being alternately switched between operative and inoperative conditions, whereby an oscillatory frequency signal is first transmitted by the transmitter to energize the oscillatory circuit of the coupling circuit, and then the transmitter is switched off and the receiver is switched on to receive the oscillatory frequency signals from the coupling circuit.

9 Claims, 2 Drawing Figures

DEVICE FOR THE TRANSMISSION OF MEASURED VALUES

BACKGROUND OF THE INVENTION

The invention relates to a device for the transmission of a measured value from a movable object to an object fixed relative thereto, particularly from a vehicle wheel to the chassis of a motor vehicle, this device comprising a transmitting stage which transmits a frequency signal and contains an oscillatory circuit, and a receiving stage which contains an oscillatory circuit, and wherein a coupling circuit is provided on the movable object by way of which coupling circuit a frequency signal can be fed to the receiving stage.

PRIOR ART

In known devices of this kind, the oscillatory circuit in the transmitting stage, the oscillatory circuit in the receiving stage, and the coupling circuit provided on the object are all tuned to a specific frequency, whereby the frequency signal transmitted by the oscillatory circuit of the transmitting stage can make the oscillatory circuit of the coupling element oscillate, and the frequency signal transmitted in turn by the coupling element reacts upon the oscillatory circuit of the receiving stage.

In devices for controlling the air pressure in motor vehicle tires, the transmitting stage and the receiving stage are fixed on the chassis, while the coupling circuit is fixed on the rim of a vehicle wheel and can, by means of a pressure switch actuated by the air pressure in the tire, be switched so as to be operative or inoperative. The transmission or non-transmission of a frequency signal by the coupling circuit, which is received and utilized by the oscillatory circuit of the receiving stage, can be employed to obtain an indication of a specific air pressure in the tire. To achieve a fully satisfactory operation of these devices, the transmitting and the receiving oscillatory circuits must be well uncoupled since otherwise the receiving oscillatory circuit is acted upon directly by a signal not only from the coupling circuit but also from the transmitting circuit.

For the uncoupling of the transmitting circuit and the receiving circuit, it is known to arrange the transmitting and the receiving circuit in a special geometrical configuration. The uncoupling thus achieved, however, is relatively small, and moreover, it may be unfavorably affected by metal objects present in the environment of the two circuits. As a result thereof, the space between the coupling circuit provided on the vehicle wheel on the one hand, and the transmitting and receiving circuits on the other hand, must be kept small, which disadvantage becomes more serious by the fact that a large distance between the coupling circuit on the one hand, and the two other circuits on the other hand, is an indispensable condition for the application of such an air pressure control system on a large scale in passenger vehicles as well as in trucks.

In another known device, the uncoupling of the transmitting circuit and the receiving circuit is accomplished by the provision in the transmitting stage of a further oscillatory circuit and by the use of different oscillation frequencies for the two circuits of the transmitting stage.

The two frequency signals transmitted from the transmitting stage are mixed in the coupling circuit. The coupling circuit transmits, therefore, a third frequency signal of a frequency either higher or lower than the two other signal frequencies, to the receiving circuit which is tuned to this third frequency. By this device, a very good uncoupling between the transmitting circuit and the receiving circuit can be obtained. However, the relatively high electronic expense required by such a device is disadvantageous.

SUMMARY OF THE INVENTION

These disadvantages of the known devices are overcome by the invention. It is, therefore, a principal object of the invention to disclose a device of the initially described type, wherein on the one hand a good uncoupling between the transmitting circuit and receiving circuit is provided which permits a relatively large space between the coupling circuit and the two other circuits, and on the other hand the structural expense is as small as possible. Moreover, the structural volume of the device is as small as possible, so that it can be mounted without difficulties, especially on a motor vehicle.

This object is achieved according to the invention on the basis of the initially described device by the provision of means which alternately switch the transmitting stage and the receiving stage to the operative position.

In the device of the invention, the uncoupling of the transmitting stage and the receiving stage is therefore carried out in time periods, e.g., first the transmitting stage is switched to the operative position during a specific time period, then it is switched to the inoperative position; and then the receiving stage is switched to the operative position so that it can receive the frequency signal transmitted from the coupling circuit.

The switching from the transmitting operation to the receiving operation must in this process take place so rapidly that the receiving stage can receive at least a substantial portion of the fading-out oscillation in the coupling circuit which was stimulated during the transmitting operation. By the measures of the invention, a nearly complete uncoupling of the transmitting stage and the receiving stage is achieved, which means that the distance between the coupling circuit and the two other circuits can be considerably increased in comparison with the known devices.

In a particularly advantageous embodiment of the invention, a single oscillatory circuit for the transmitting stage and the receiving stage is provided. Such an embodiment entails the advantage, that on the basis of the presence of only a single circuit on the transmitting and receiving side the device is of a particularly small structural volume and the assembly of the device is substantially simplified as compared to that of the known devices.

According to an advantageous embodiment, switches controlled directly or indirectly by a synchronizing pulse generator are provided, which during a specific first time period switch the transmitting stage to the operative position, and during a specific second time period following the first one, switch the receiving stage to the operative position. In order to prevent incorrect measurements, it is advisable to let the period when the receiving stage is switched to the operative position not immediately commence at the end of the period when the transmitting stage is switched to the operative position, but with a delay in time. This enables oscillations still present in the circuit after the switching of the trasmitting stage to the inoperative position to fade out before the circuit with the receiving stage is switched to the operative position.

In addition, in a further advantageous development of the invention, means may be provided which damp the circuit before the receiving stage is switched to the operative position. Thus, the time interval between the end of the first period and the beginning of the second period can be substantially shortened, which entails the advantage that the frequency signal transmitted from the coupling circuit can be received at a moment when it has not yet faded too much. As a result, the electronic expense in the receiving circuit can be reduced. As a means to damp the circuit, it is most practical to provide a switch that short-circuits the circuit, controlled by the pulse generator.

In a still further advantageous embodiment, the pulse generator is connected, via a first monoflap, to a switch that supplies voltage to the circuit, and via a time delay element and a second monoflop, to a switch which switches the receiving stage to the operative position. As the time delay element, a further monoflop may be provided. When a switch that short-circuits the circuit is present in this embodiment, the switch can be controlled in a simple manner by the second monoflop, while between the second monoflop and the receiving stage a further time delay element is provided. The described embodiment presents the special advantage that it can be composed from inexpensive commercial structural elements.

According to a further concept of the invention, the transmitting stage contains an oscillator that oscillates with the resonance frequency of the oscillatory circuit, this oscillator being capable of being switched to the circuit via a conjunction element controlled by a monoflop. In such an embodiment, it is possible to set the beginning of the second period when the receiving stage is switched to the operative position immediately at the end of the first period when the transmitting stage is switched to the operative position. Thus, the receiving stage can be switched to the operative position at a moment when the oscillations in the coupled circuits have not yet—or only to a minor degeee—faded. The advantages resulting therefrom have already been mentioned above. It has proven particularly practical to provide for the transmitting stage a start-stop oscillator in a tri-state construction which oscillates with a frequency that corresponds to the resonance frequency of the oscillatory circuit and is controlled via a monoflop controlled by the pulse generator. In this structure, the oscillator is brought, at the end of the oscillating period to a high resistive tri-state condition, so that the circuit is no longer loaded and is ready to receive the frequency signal transmitted from the coupling circuit.

The utilization in the receiving circuit of the frequency signal transmitted by the coupling circuit, takes place most suitably by means of a converter which transforms the frequency signal received into a sequence of pulses of the same frequency, and a counter fed thereby which, after the receiving circuit has been switched to the operative position during a specific period, counts the pulses and transmits a signal when a specific, prespecified counter contents is reached.

In such an embodiment of the receiving circuit, the latter may be in continuous connection to the circuit associated with the transmitting stage and the receiving stage. The switching of the receiving stage to the operative position consists then in that the reset input of the counter is fed a low-signal for a specific period, while it is normally fed a high-signal.

In yet another advantageous embodiment of the invention, the counter controls a transistor whose emitter-collector path is connected to operating voltage. The transistor which is normally in its blocking state, is, when a specific counter contents is reached, switched within the prescified period to its conducting direction, whereby the current in the supply line increases by a specific value. This current increase can be utilized for releasing an indication in an indicator stage. The special advantage of such a connection consists in that, for the transmission of the signal transmitted from the receiving stage to the indicating stage, no additional line is necessary but rather this signal is transmitted, via the supply voltage line to the indicator stage. This simplifies the assembly of the device considerably.

The invention will be explained in greater detail with the aid of the drawings, which contain two embodiments.

DETAILED DESCRIPTION OF THE PREFERRED EMBODIMENTS

Figure 1:
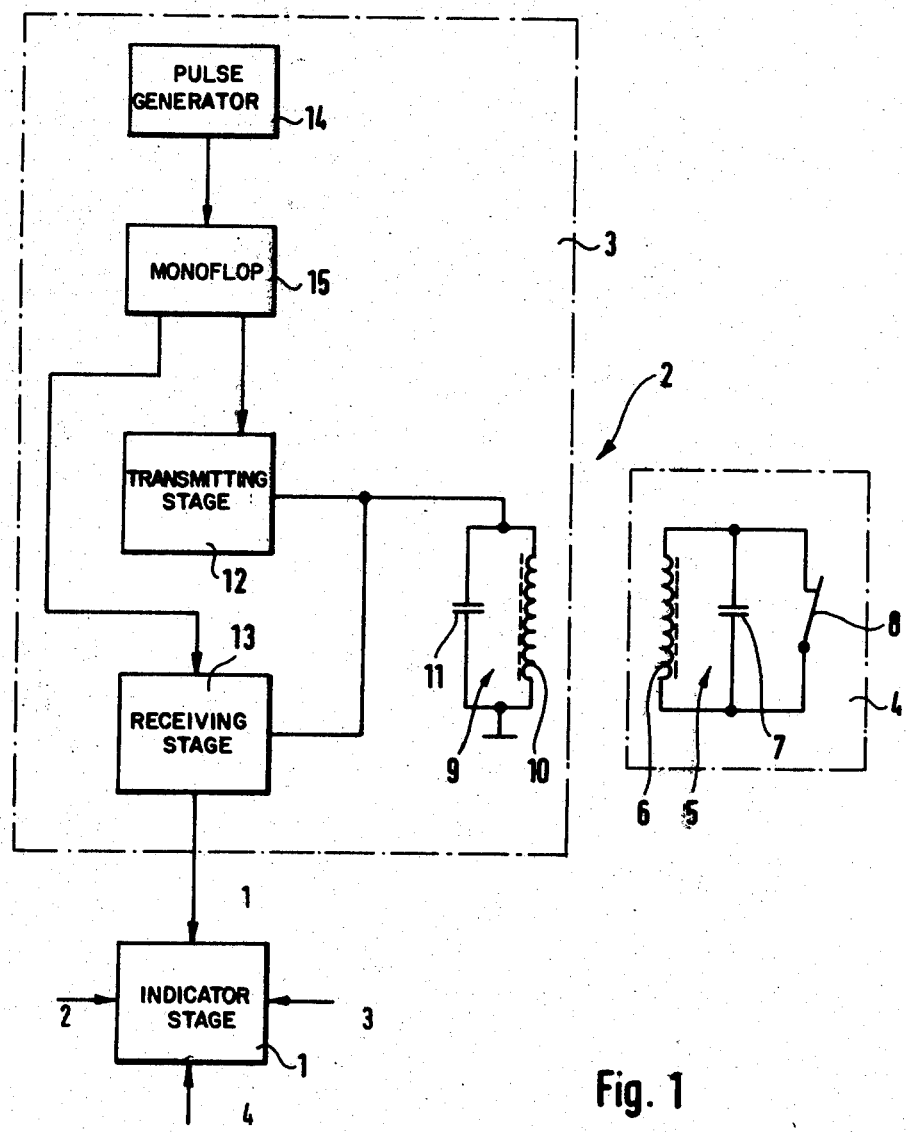
FIG. 1 is a schematic diagram of a device with a transmitting stage containing a start-stop oscillator.

The device according to FIG. 1, which is provided for the control of the air pressure in the four tires of a motor vehicle, contains an indicator stage 1 to which the four control stations 2 for the individual wheels are connected. Each of the four control stations 2, which are all of the same structure, comprises a part 3, fixed on the chassis, and a part 4, arranged on the wheel rim.

Part 4 contains a parallel resonant circuit 5, which consists of a ferrite core coil 6 and a condenser 7, as well as a pressure switch 8 which is connected, via the tire valve, with the interior of the tire. The pressure switch is open at normal air pressure of the tire, so that the parallel resonant circuit 5 is un-damped, and closes as soon as the air pressure in the tire drops below a specific prespecified value. The choice of a normally open switch is advisable since in this case the device regarding the coupling circuit is self-controlling, in other words, in this case, e.g., an alarm takes place when the coupling circuit fixed on the rim of the vehicle wheel fails to operate.

In part 3 which is fixed on the vehicle chassis, a further parallel resonant circuit 9 is provided which consists also of a ferrite core coil 10 and a capacitor 11. The resonance frequency of circuit 9 equals that of circuit 5 and amounts to about 50 kHz.

A transmitting stage 12 and a receiving stage 13, which can be switched to the operative position alternately in connection with circuit 9, are associated with parallel resonant circuit 9. For this purpose a pulse generator 14 is provided which transmits a pulse sequence with a frequency of about 1 kHz. A monoflap is connected in series to this pulse generator so as to follow it, which monoflop is switched at each pulse arriving from the pulse generator into its quasi-stable state, and switched after a specific prespecified period back into its stable state. When monoflop 15 is brought into its quasi-stable state, a signal appears at its output which starts a start-stop oscillator provided in transmitting stage 12. This oscillator oscillates with a frequency which corresponds to the resonance frequency of circuit 9, so that circuit 9 is energized and transmits, via ferrite core coil 10, a frequency signal to circuit 5. As soon as monoflop 15 switches back from its quasi-stable state to its stable state the start-stop oscillator in the transmitting stage 12 is switched off and brought into a high resistive state so that it no longer loads the circuit. Therewith circuit 9 also stops oscillating. When pressure switch 8 is in the position where it short-circuits circuit 5, circuit 5 cannot be energized by the frequency signal transmitted from circuit 9 and can consequently itself not transmit a frequency signal. When, however, switch 8 is open, circuit 5 is made to oscillate by the frequency signal transmitted from ferrite core coil 10, and can in turn make circuit 9 oscillate by the frequency signal transmitted from ferrite core 6, when the transmitting stage is switched to the inoperative position. In this case, a frequency signal passes from circuit 9 to receiving stage 13 which utilizes the signal.

In this embodiment, receiving stage 13 is switched to its operative or inoperative position from monoflop 15, namely from the output thereof that corresponds to the stable state. When, thereefore, monoflop 15 is in its stable state, receiving stage 13 is switched to the operative position. As soon as, however, monoflop 15 is brought into its quasi-stable state and the transmitting stage is switched to its operative position, the corresponding signal change in the output of the monoflop switches receiving stage 13 to the inoperative position. When monoflop 15 switches back into its stable state, the transmitting stage is again switched to its inoperative position, and the receiving stage to its operative position. The two periods when the transmitting stage and the receiving stage are switched to the operative position therefore follow each other without time delay.

Figure 2:
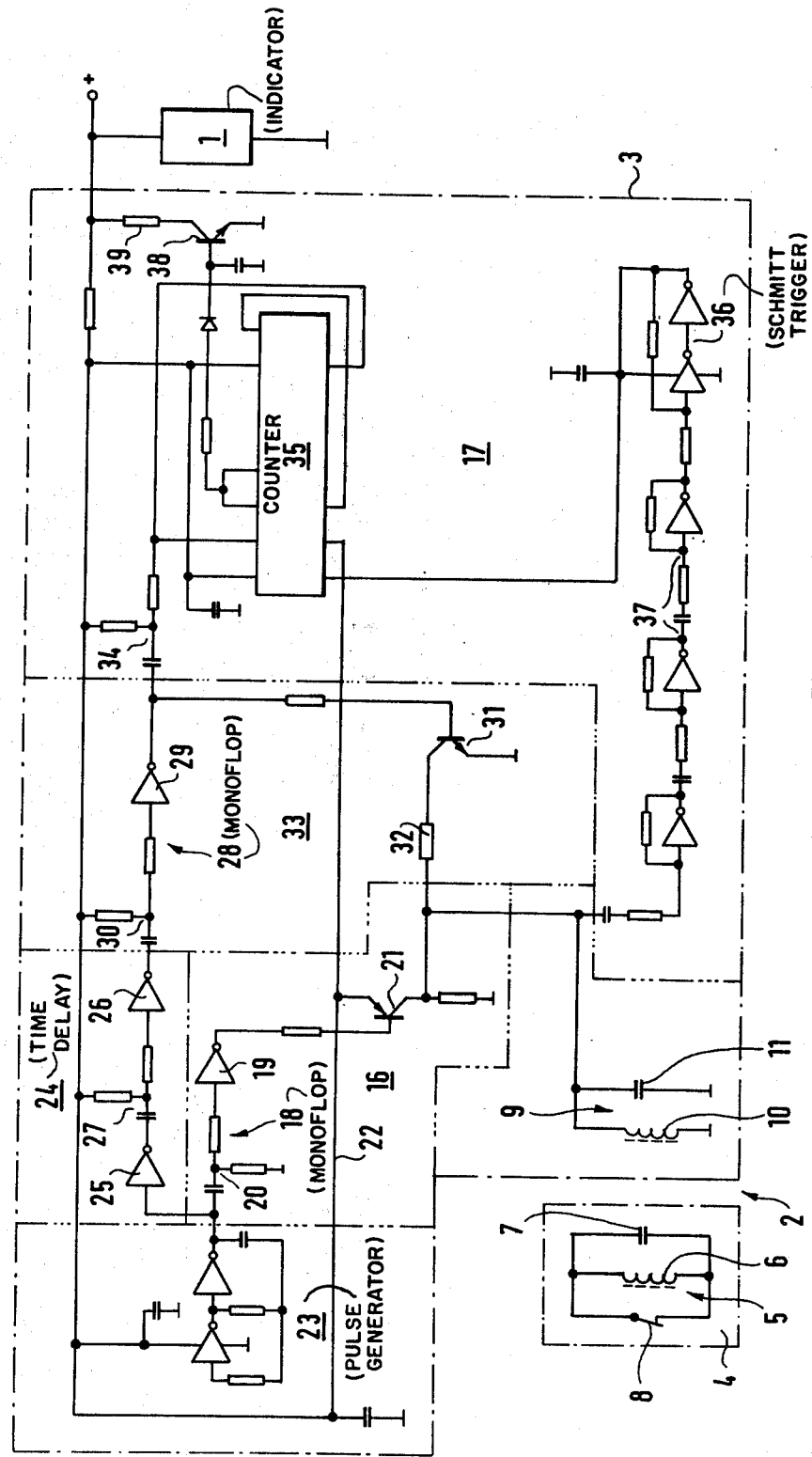
FIG. 2 is a circuit diagram of a modification of the invention.

The device according to FIG. 2, which likewise is provided for the control of the air pressure in a vehicle tire, consists of a control station 2 for each tire to be controlled, each control station 2 comprising a part 3 fixed on the chassis, and a part 4 fixed on the tire. The structure of part 4 is the same as in the embodiment described above.

Part 3, fixed on the chassis, contains a parallel resonant circuit 9 with a ferrite core coil 10 and a condenser 11, connected on the one hand to a transmitting stage 16 and on the other hand to a receiving stage 17.

Transmitting stage 16 contains a monoflop 18 which consists of an inverter 19 and an RC differentiating element 20 positioned at the input of the inverter, and a transistor 21 which is controlled by inverter 19 and via whose emitter-collector path circuit 9 can be connected to a line 22 which carries positive potential. The control of monoflop 18 takes place from a pulse generator 23 which is constructed in the form of an RC oscillator.

Furthermore, a time delay element 24 is connected to the output of pulse generator 23, consisting of two inverters 25 and 26, as well as of an RC element 27. It can be recognized that the time delay element operates like a monoflop. A further monoflop 28 is connected to the output of time delay element 24, which monoflop 28 consists of an inverter 29 and an RC element 30. The output of monoflop 28 is connected to a transistor 31 whose emitter-collector path is connected, via a low resistance resistor 32, on the one hand to circuit 9 and on the other hand to the ground. This is the damping circuit 33 for circuit 9.

The output for monoflop 28 is, furthermore, connected via a further delay element 34 to an electronic counter 35. A Schmitt trigger 36 is connected to the counting input of counter 35, which Schmitt trigger transforms the oscillations occurring in circuit 9 and amplified by an amplifier 37 into counting pulses. Outputs of counter 35 corresponding to a specific counter contents are connected jointly to the base of a transistor 38 whose collector is connected via a resistor to line 22 which carries positive potential, and whose emitter is connected to the ground.

The indicator stage for the device is also connected to this positive-potential carrying line 22.

For the purpose of explaining the operation of the device, it is assumed that pressure switch 8 is open, therefore circuit 5, if it is energized, can oscillate. When pulse generator 23 transmits a pulse to monoflop 18, the latter is brought to its quasi-stable state and transmits a control signal to transistor 21 which is acted upon and connects circuit 9 to line 22 which carries positive potential. After a period prespecified by the switching period of monoflop 18, monoflop 18 switches back into its stable state, whereby transistor 21 is brought to its blocking state again. By the action upon circuit 9 through a voltage pulse, circuit 9 is energized and starts oscillating, in which process the oscillations slowly fade. During the oscillation process the ferrite core coil transmits an alternating field which acts upon ferrite core coil 6 of circuit 5 and makes it oscillate since in fact the switch is open according to the aforementioned condition.

The pulse transmitted by pulse generator 23 passes not only to monoflop 18 but also, via time delay stage 24, to monoflop 28. After a specific time period which is determined by the time delay of time delay element 24, this monoflop 28 is brought into its quasi-stable state, whereby transistor 31 becomes conductive and damps the circuit via resistor 32, so that the oscillations in the circuit stop.

Then, only parallel resonant circuit 5 produces oscillations which are coupled to circuit 9. As soon as monoflop 28 is switched back to its stable state, transistor 31 blocks again, and circuit 9 is then connected exclusively to receiving stage 17, separated by transistors 21 and 31 from stages 16 and 33.

Monoflop 28 acts via a further time delay element 34 upon counter 35 in such a manner that the latter is first set to zero and subsequently counts within a specific period determined through RC element 34, the number of the oscillations of circuit 9 which are amplified by amplifiers 37 and are subsequently transformed into counting pulses by Schmitt trigger 36. When during the period, a specific prespecified counting contents is reached, which means that pressure switch 8 is open and therefore a proper air pressure prevails in the tire, transistor 38 is and remains acted upon.

When the tire pressure is too low, switch 8 is closed and circuit 5 is not able to vibrate. This means that at the end of the damping phase, when therefore transistor 31 is brought back to its blocking state and oscillations are no longer present in circuit 9, circuit 9 cannot be made to oscillate by circuit 5. In this instance no counting pulses appear at the counting input of counter 35 during the counting phase, so that transistor 38 is brought into its blocking state. If resistor 39 is properly dimensioned, this effects a sudden drop of the current in line 22 by a specific value, which result can be utilized for controlling indicator stage 1.

I claim:

1. A device for the transmission of a measured value from a movable object to an object fixed relative thereto, particularly from a vehicle wheel to the chassis of a motor vehicle, comprising a transmitting stage which transmits a frequency signal and contains an oscillatory circuit, a receiving stage which contains an oscillatory circuit, and a coupling circuit provided on the movable object by way of which circuit a frequency signal can be fed to the receiving stage, characterized in that the oscillatory circuit for the transmitting and receiving stages comprises a single oscillatory circuit common to both stages, means for alternately switching the transmitting stage and the receiving stage to the operative position, said means comprising switches controlled by a pulse generator, which switches switch during a specific first period the transmitting stage to the operative position, and during a specific second period, which follows the first period, switch the receiving stage to the operative position, and means are provided which damp the oscillatory circuit before the receiving stage is switched to the operative position.

2. A device as in claim 1, characterized in that the pulse generator is connected via a first monoflop to a switch which supplies voltage to the oscillatory circuit and is further connected via a time delay element and a second monoflop to a switch which switches the receiving stage to the operative position.

3. A device as in claim 2, characterized in that a switch which short-circuits the oscillatory circuit is provided which is controlled by the pulse generator.

4. A device as in claim 3, characterized in that the switch that short-circuits the oscillatory circuit is controlled by the second monoflop and that between the second monoflop and the receiving stage a further time delay element is provided.

5. A device as in claim 1, characterized in that the transmitting stage contains an oscillator which oscillates with the resonance frequency of the oscillatory circuit, which oscillator can be switched to the oscillatory circuit via a conjunction element controlled by a monoflop.

6. A device as in claim 1, characterized in that the transmitting stage contains a start-stop oscillator in tri-state structure which oscillates with a frequency that corresponds to the resonance frequency of the oscillatory circuit, and is controlled via a monoflop controlled by the pulse generator.

7. A device as in claim 6, characterized in that the receiving stage contains a converter which transforms the received frequency signal into a pulse sequence of the same frequency, and also contains a counter fed by the said converter, which counter counts the pulses and transmits a signal after the receiving stage has been switched to the operative position during a specific period, after a specific counter contents is reached.

8. A device as in claim 7, characterized in that the counter acts upon a transistor which with its emitter-collector path is connected to operating voltage.

9. A device for the transmission of a measured value from a movable object to an object fixed relative thereto, particularly from a vehicle wheel to the chassis of a motor vehicle, comprising a transmitting stage which transmits a frequency signal and contains an oscillatory circuit, a receiving stage which contains an oscillatory circuit, and a coupling circuit provided on the movable object by way of which circuit a frequency signal can be fed to the receiving stage, characterized in that the oscillatory circuit for the transmitting and receiving stages comprises a single oscillatory circuit common to both stages, means for alternately switching the transmitting stage and the receiving stage to the operative position, said means comprising switches controlled by a pulse generator, which switches switch during a specific first period the transmitting stage to the operative position, and during a specific second period, which follows the first period, switch the receiving stage to the operative position, the transmitting stage containing a start-stop oscillator in tri-state structure which oscillates with a frequency that corresponds to the resonance frequency of the oscillatory circuit, and is controlled via a monoflop controlled by the pulse generator, and said receiving stage containing a converter which transforms the received frequency signal into a pulse sequence of the same frequency, and also contains a counter fed by the said converter, which counter counts the pulses and transmits a signal after the receiving stage has been switched to the operative position during a specific period, after a specific counter contents is reached.

* * * * *

UNITED STATES PATENT AND TRADEMARK OFFICE
CERTIFICATE OF CORRECTION

PATENT NO. : 4,312,001

DATED : January 19, 1982

INVENTOR(S) : René Marzolf

It is certified that error appears in the above-identified patent and that said Letters Patent are hereby corrected as shown below:

On the front page of the patent

Item No. [73] Assignee delete "Schinling" and substitute therefor -- Schindling--.

Signed and Sealed this

Twenty-second Day of June 1982

[SEAL]

Attest:

Attesting Officer

GERALD J. MOSSINGHOFF

Commissioner of Patents and Trademarks